US011117296B2

(12) United States Patent
Autschbach et al.

(10) Patent No.: US 11,117,296 B2
(45) Date of Patent: Sep. 14, 2021

(54) MOLDING TOOL

(71) Applicant: tooz technologies GmbH, Aalen (DE)

(72) Inventors: Lutz Autschbach, Oberkochen (DE); Kai Bartel, Lorch (DE)

(73) Assignee: tooz technologies GmbH

(*) Notice: Subject to any disclaimer, the term of this patent is extended or adjusted under 35 U.S.C. 154(b) by 0 days.

(21) Appl. No.: 16/340,915

(22) PCT Filed: Oct. 12, 2017

(86) PCT No.: PCT/EP2017/076023
§ 371 (c)(1),
(2) Date: Apr. 10, 2019

(87) PCT Pub. No.: WO2018/069428
PCT Pub. Date: Apr. 19, 2018

(65) Prior Publication Data
US 2020/0039133 A1    Feb. 6, 2020

(30) Foreign Application Priority Data
Oct. 14, 2016   (DE) .......................... 102016119636.3

(51) Int. Cl.
*B29C 45/26*   (2006.01)
*B29D 11/00*   (2006.01)

(52) U.S. Cl.
CPC ...... *B29C 45/2673* (2013.01); *B29C 45/2606* (2013.01); *B29D 11/00519* (2013.01)

(58) Field of Classification Search
CPC ............ B29C 45/2673; B29C 45/2606; B29C 45/2675; B29C 45/2602; B29D 11/00519
See application file for complete search history.

(56) References Cited

U.S. PATENT DOCUMENTS

| 4,184,835 | A | * | 1/1980 | Talbot | B29C 43/361 |
| | | | | | 425/577 |
| 4,664,854 | A | * | 5/1987 | Bakalar | B29C 45/561 |
| | | | | | 264/2.2 |
| 4,820,149 | A | * | 4/1989 | Hatakeyama | B29C 45/56 |
| | | | | | 425/555 |
| 4,867,672 | A | * | 9/1989 | Sorensen | B29C 45/36 |
| | | | | | 425/577 |
| 4,980,115 | A | * | 12/1990 | Hatakeyama | B29C 45/2669 |
| | | | | | 264/328.13 |
| 5,249,947 | A | | 10/1993 | Inaba | |
| 5,288,221 | A | | 2/1994 | Stoerr et al. | |
| 5,512,221 | A | * | 4/1996 | Maus | B29C 33/308 |
| | | | | | 264/2.2 |

(Continued)

FOREIGN PATENT DOCUMENTS

DE    904345    2/1954
DE    4306892   9/1993

(Continued)

*Primary Examiner* — Xiao S Zhao
*Assistant Examiner* — Emmanuel S Luk
(74) *Attorney, Agent, or Firm* — Sand, Sebolt & Wernow Co., LPA

(57) ABSTRACT

The invention presents molding tools, in which a position of a molding tool within a base tool or a position of molding cores relative to each other can be set by adjusting a position of base tools by means of controllable adjustment elements.

20 Claims, 4 Drawing Sheets

(56) References Cited

U.S. PATENT DOCUMENTS

| | | | | |
|---|---|---|---|---|
| 5,529,483 | A * | 6/1996 | Abe | B29C 45/561 |
| | | | | 425/589 |
| 5,733,585 | A * | 3/1998 | Vandewinckel | B29C 45/376 |
| | | | | 264/1.1 |
| 5,792,392 | A * | 8/1998 | Maus | B29D 11/00413 |
| | | | | 264/2.5 |
| 5,989,471 | A * | 11/1999 | Lian | H01L 21/67126 |
| | | | | 100/258 R |
| 6,120,279 | A | 9/2000 | Vovan | |
| 6,248,281 | B1 * | 6/2001 | Abe | B29C 45/561 |
| | | | | 264/328.7 |
| 6,875,384 | B1 * | 4/2005 | Whitney | B29C 45/80 |
| | | | | 264/40.5 |
| 7,300,271 | B2 * | 11/2007 | Parmenter | B29C 45/2606 |
| | | | | 425/190 |
| 7,311,506 | B2 * | 12/2007 | Border | B29C 45/2606 |
| | | | | 425/135 |
| 7,494,334 | B2 * | 2/2009 | Tsai | B29C 33/308 |
| | | | | 425/190 |
| 7,563,088 | B2 * | 7/2009 | Tsai | B29C 43/36 |
| | | | | 425/193 |
| 7,891,970 | B2 * | 2/2011 | Hoogland | B29C 43/36 |
| | | | | 425/577 |
| 7,950,253 | B2 * | 5/2011 | Utsugi | C03B 11/08 |
| | | | | 264/1.32 |
| 7,980,845 | B2 * | 7/2011 | Huang | B29C 33/303 |
| | | | | 425/182 |
| 2001/0053395 | A1 * | 12/2001 | Hosoe | B29C 43/36 |
| | | | | 425/408 |
| 2003/0185930 | A1 | 10/2003 | Hechtl | |
| 2004/0217495 | A1 | 11/2004 | Takeda | |
| 2007/0122514 | A1 * | 5/2007 | Tsai | B29C 33/303 |
| | | | | 425/190 |
| 2007/0190204 | A1 * | 8/2007 | Chiang | B29C 45/376 |
| | | | | 425/577 |
| 2008/0054239 | A1 | 3/2008 | Porel | |
| 2014/0199924 | A1 | 7/2014 | Jaeger | |
| 2014/0232072 | A1 * | 8/2014 | Ayguen | B23B 31/003 |
| | | | | 279/4.06 |
| 2016/0096300 | A1 * | 4/2016 | Hopfner | B29C 45/0408 |
| | | | | 425/161 |

FOREIGN PATENT DOCUMENTS

| | | |
|---|---|---|
| DE | 19507009 | 8/1996 |
| JP | H0197617 | 4/1989 |
| JP | 2007125809 | 5/2007 |
| WO | 2007/126316 | 11/2007 |

* cited by examiner

MOLDING TOOL

TECHNICAL FIELD

The present application relates to a molding tool for the injection molding of plastics or the injection compression molding of plastics, especially optical plastic elements, e.g. lenses. Optical plastic elements of this kind can be used to produce smart glasses, for example.

BACKGROUND

A conventional molding tool is illustrated in FIG. 6. The molding tool illustrated in FIG. 6 comprises two halves, wherein a first half is denoted by A and a second half is denoted by B. Reference signs with "A" at the end (e.g. 1A, 2A etc.) refer to the first half A, and reference signs with "B" at the end (e.g. 1B, 2B etc.) refer to the second half B. If the suffix A or B is omitted in the following explanation, the explanation relates to the corresponding elements of both halves A, B. In that case, the reference sign 1 then includes both the reference sign 1A and the reference sign 1B, for example.

Each of the halves comprises a base tool 1 (1A or 1B), into which a respective molding core 3 is inserted. Each molding core 3 has a respective molding surface 7. To produce a plastic element, the halves A, B are brought together, as explained in greater detail below, and plastic is injected between the molding surfaces 7A, 7B, wherein the shape of the molding surfaces 7A, 7B then determines the shape of the plastic element to be produced.

The molding core 3 is fixed in the base tool 1 via a support plate 2 by means of clamping and screw fastening. To install the molding core 3, the support plate 2 is removed (by undoing corresponding screws, which are not illustrated) and the molding core is inserted into the base tool. Vertical adjustment of the molding core is performed by means of distance plates 8, 9. In this case, the distance plates 8, 9 are simple plate-shaped elements, which are available in various thicknesses, in order in this way to bring about a vertical adjustment. After adjustment, the molding core may then be screwed to the base tool before the support plate 2 is reinserted and likewise screwed to the base tool 1.

The base tool 1 furthermore has sealing plates 6, which seal off a space in which the element to be produced is molded (between the molding surfaces 7) as the halves A, B are joined together. Moreover, the elements 6 can serve as a measurement reference. In this case, the elements 6 can be designed as a measurement reference inasmuch as they have defined geometry features, e.g. defined flat surfaces, cylinders, circular holes, cones etc., which can be calibrated in position and orientation by means of suitable tactile or optical measurement systems.

For the production of the respective plastic element, also referred to as molding, the halves A, B, i.e. the molding tools 1A, 1B with the molding cores 3A, 3B inserted therein, are moved together, wherein, for guidance, guide columns 4B of base tool 1B engage in corresponding guide holes 4A of base tool 1A and thus allow guidance. It should be noted that it is likewise possible for guide columns to be mounted on base tool 1A and for corresponding guide holes to be formed in base tool 1B. A fine adjustment, which is set before the molding process, can be accomplished by means of a precision guide 5 with a ball cage (i.e. ball bearing guide). To produce the corresponding plastic element, the halves A, B are brought together, and a corresponding plastic is injected into a space between the molding surfaces 7A, 7B,
held and, if appropriate, further compressed (in the case of the injection compression molding of plastics).

In the case of injection molding of plastics, plastic pellets are heated and hence liquefied and are injected by means of a feed system between two mold halves that have been moved together.

In the case of injection compression molding of plastics, the procedure is in principle the same as with injection molding except that the molding surfaces 7 of the molding cores 3 are not moved together completely or not moved together completely in parts. After the injection of the plastic, a compression stroke/pressure is exerted over the remainder of the closure travel in order, for example, to be able to completely fill regions which are difficult to fill, to homogenize the material, to squeeze residual air out of the system etc.

After the plastic has cooled sufficiently and has solidified, the halves A, B are separated again, and the workpiece produced is released by means of ejectors 10, which extend out of base tool 1A in order to release the workpiece from molding core 3A. In addition or as an alternative, corresponding ejectors can also be arranged in base tool 1B.

It should be noted that FIG. 6 shows a merely schematic illustration of a conventional molding tool, and some details which are present in conventional molding tools are not illustrated explicitly, e.g. the sprue, hot/cold runners, sensors, hydraulics, air admission/air extraction, compression functions (for the injection compression molding of plastics), machine holder (interface between the base tool halves 1A, 1B and a molding machine which uses the molding tool illustrated) etc. In this context, the sprue is the part on the injection-molded/injection compression-molded plastic element where the plastic has flowed in and which is cut off in a subsequent production step. Hot/cold runners are channels in the base tool 1 through which the plastic flows. They can be without dedicated temperature control or can be provided with heating/cooling elements. Moreover, process data, such as temperature, pressure, flow rates, are required for open-loop/closed-loop control for injection molding/injection compression molding. Corresponding sensors on/in the base tool 1 or on/in the molding cores 3 supply this data. A hydraulic system can be required to move component elements, e.g. for compression, for the ejectors etc. Moreover, air can be trapped as the base tool halves are moved together. This can have a negative effect on the injection molding/injection compression molding process. By means of an air admission/air extraction system, this region can be subjected to a vacuum by means of pumps etc. Conversely, it may be necessary to supply air in a defined manner as the base tools 1 are opened etc. in order to avoid reduced pressures.

It should be noted that, in the example in FIG. 6, each base tool 1 has a molding core 3, and each molding core 3 has a molding surface 7. However, it is also possible for a plurality of molding cores and/or a plurality of molding surfaces to be provided. Thus, the illustration and description of molding tools with one molding core and one molding surface does not exclude the possibility that a plurality of molding cores and/or a plurality of molding surfaces are present.

A molding tool as illustrated in FIG. 6 is an effective way of producing many conventional plastic injection molded parts. However, if tolerances are in the range of a few micrometers, as required for optical elements, the molding tool in FIG. 6 has various disadvantages.

As the molding cores 3 are inserted into the base tools, the gap dimensions are generally in the range of a few micrometers, and therefore precise adjustment may be difficult. In this case, adjustment is performed, inter alia, by means of the distance plates 8, 9, wherein the plates must be exchanged to modify the adjustment. For this purpose, the respective half A or B must be largely disassembled, i.e. the respective support plate 2 must be unscrewed and the respective molding core must be released before the distance plates 8, 9 can be exchanged. During assembly, new assembly tolerances may then arise, and therefore repeated readjustment will be necessary.

Moreover, the tolerances during the moving together of the halves A, B may be relatively high in conventional approaches. Moreover, it is virtually impossible to perform an angular correction of the molding cores 3 individually or relative to one another in a defined manner during installation and during the moving together of the halves A, B. This makes more difficult at least the use of such conventional molding tools for the production of workpieces on which it is necessary to maintain tolerances in the micrometer range, e.g. optical elements.

It is therefore an object to mitigate the above-described disadvantages completely or partially and to provide molding tools which are at least better suited than the conventional molding tools for the production of workpieces with tolerances in the micrometer range.

SUMMARY

According to the invention, a molding tool is provided, comprising:

at least one controllable adjustment element for determining the position of a molding core of the molding tool.

Here, a controllable adjustment element should be taken to mean an element with which adjustment can be performed by control from outside, in particular via control lines. In particular, the adjustment can modify dimensions of the adjustment element and/or exert a pressure on other elements in order in this way to perform an adjustment.

Through the use of controllable adjustment elements of this kind, it is possible, in particular, to perform an adjustment without disassembling the molding tool.

The molding tool can comprise the molding core, wherein the molding core has an upper surface, a lower surface and lateral surfaces, wherein a (i.e. at least one) molding surface is formed on the upper surface, wherein the at least one controllable adjustment element comprises one or more adjustment elements arranged on the lateral surface of the molding core.

This makes it possible to fix the molding core in the base tool and to adjust a position thereof.

The molding tool can comprise a base tool having a (i.e. at least one) socket for the molding core, wherein the at least one controllable adjustment element comprises one or more adjustment elements arranged in the base tool.

The one or more adjustment elements arranged in the base tool can comprise one or more adjustment elements arranged in a lateral surface of the socket.

This makes it possible to fix the molding core in the base tool and to adjust a position thereof.

In addition or as an alternative, the one or more adjustment elements arranged in the base tool can comprise adjustment elements arranged on a bottom of the socket and/or adjustment elements, arranged on a lower side of a recess in the socket, for vertical position adjustment of the molding core. In this way, such an adjustment of the vertical position is possible without using distance plates.

The one or more adjustment elements arranged in the base tool can comprise one or more adjustment elements which can be moved between a first position and a second position, wherein the movable adjustment elements project into the socket in the first position in order to enter into engagement with the molding core and are retracted in the second position in order to release the molding core.

In this way, the molding core can be removed from and reinserted into the base tool easily without the need for disassembly of the molding tool, e.g. release of a support plate.

The one or more movable elements can comprise further adjustment elements of the one or more adjustment elements arranged in the base tool in order to adjust a vertical position of the molding core.

The one or more adjustment elements can be arranged and set up in such a way as to set a tilt of the molding tool.

The molding tool can further comprise the molding core, wherein the molding core has a rounded shape, thus enabling it to be tilted in the socket by actuating the one or more controllable adjustment elements.

In this way, an angular adjustment can be carried out.

The molding tool can further comprise a further base tool, wherein the base tool and the further base tool can be assembled for molding, wherein the base tool and the further base tool each have a (i.e. at least one) socket for a molding core, wherein the one or more controllable adjustment elements comprise an adjustment element for adjusting a position of the base tool relative to the further base tool in an assembled state.

For this purpose, the adjustment element for adjustment can be arranged in a guide column and/or in a guide recess.

Through the provision of a controllable adjustment element of this kind in a guide for the assembly of base tool halves, improved adjustment of base tool halves relative to one another can be achieved.

The at least one controllable adjustment element can comprise a mechanical, pneumatic and/or hydraulic adjustment element.

In particular, the at least one controllable adjustment element can comprise a hydraulic expansion clamping element.

Through the use of hydraulic expansion clamping elements, controllable adjustment elements of this kind can be implemented in a simple manner, and a good adjustment option is achieved. However, other types of adjustment element are also possible.

In particular, the above molding tool can be used to produce optical elements, e.g. lenses.

BRIEF DESCRIPTION OF THE DRAWINGS

Embodiments are explained in greater detail below with reference to the drawings. In the drawings.

DETAILED DESCRIPTION

Various embodiments are explained in detail below. It should be noted that these embodiments are used merely for illustration and should not be interpreted as restrictive.

Figure 5:
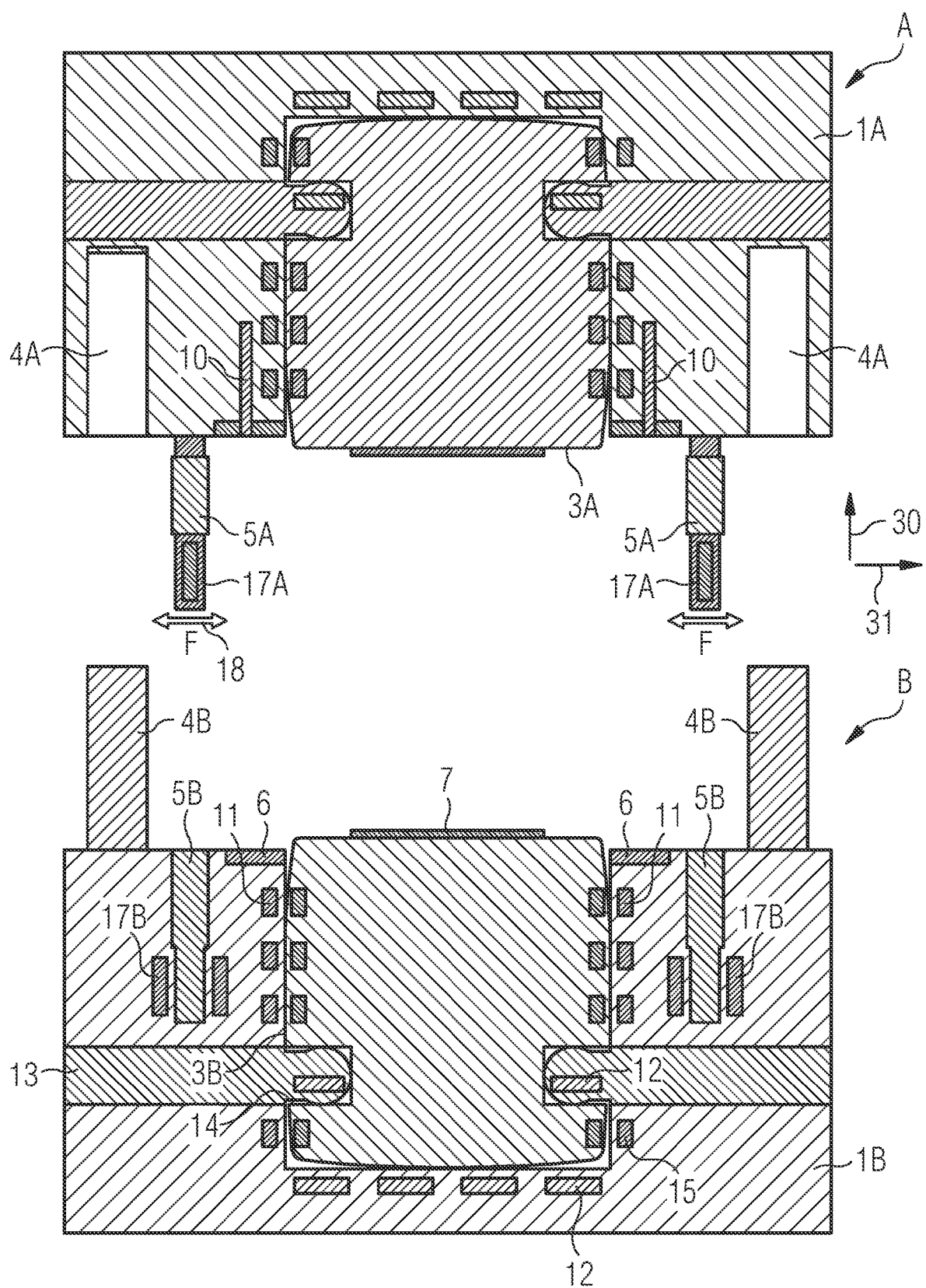
FIG. 5 shows a molding tool according to another embodiment.
Figure 6:
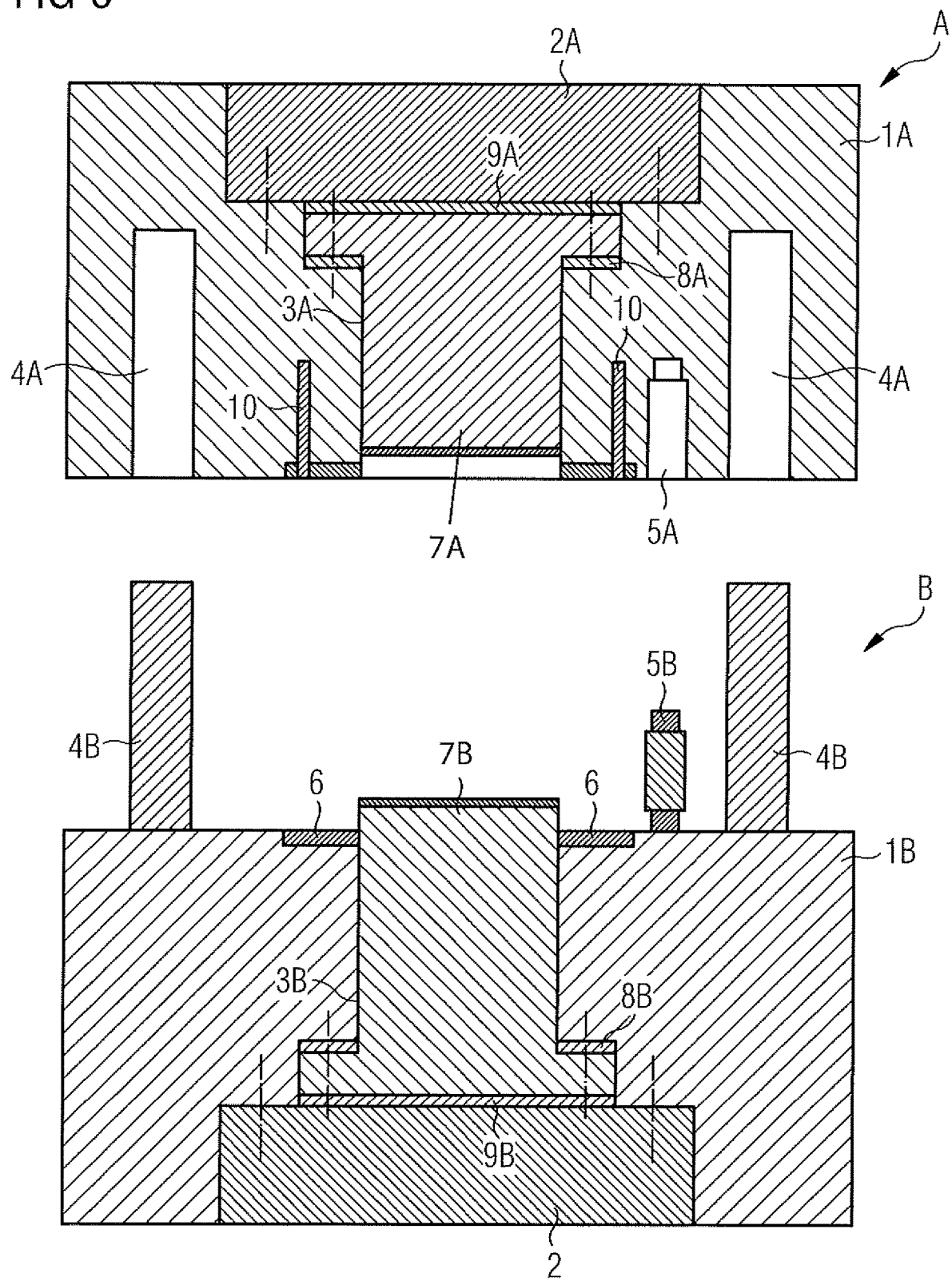
FIG. 6 shows a conventional molding tool.

For better understanding, various modifications of and additions to the conventional molding tool explained at the outset with reference to FIG. 6 are explained below with reference to FIGS. 1-5. These modifications and additions are shown in cumulative fashion, i.e. further modifications and additions are added from one figure to the next. However, it should be noted that the various modifications and additions can also be implemented independently of one another. For example, the modification and addition illustrated in FIG. 2 as an addition in comparison with FIG. 1 can also be implemented independently of the modifications and additions in FIG. 1. Here, FIGS. 1-5 show cross-sectional views of molding tools.

To avoid repetitions, elements which are identical or correspond to one another bear the same reference signs. Elements which have already been explained at the outset with reference to FIG. 6 are not explained again in detail. In addition to the explicitly illustrated components of the molding tool, further components that are not illustrated can be provided, particularly components used in conventional molding tools. The indefinite article "a" or "an" should not be taken as a numerical indicator but should be interpreted in the sense of "one or more".

Here, FIGS. 1-4 each illustrate one half of a molding tool having a base tool 1 and a molding core 3. The other half in each case can be configured in a corresponding manner. A direction indicated by an arrow 30 is referred to below as the vertical direction and a direction indicated by an arrow 31 is referred to as a horizontal direction. This serves merely for simple designation and does not imply any specific position of the illustrated molding tools during use.

Figure 1:
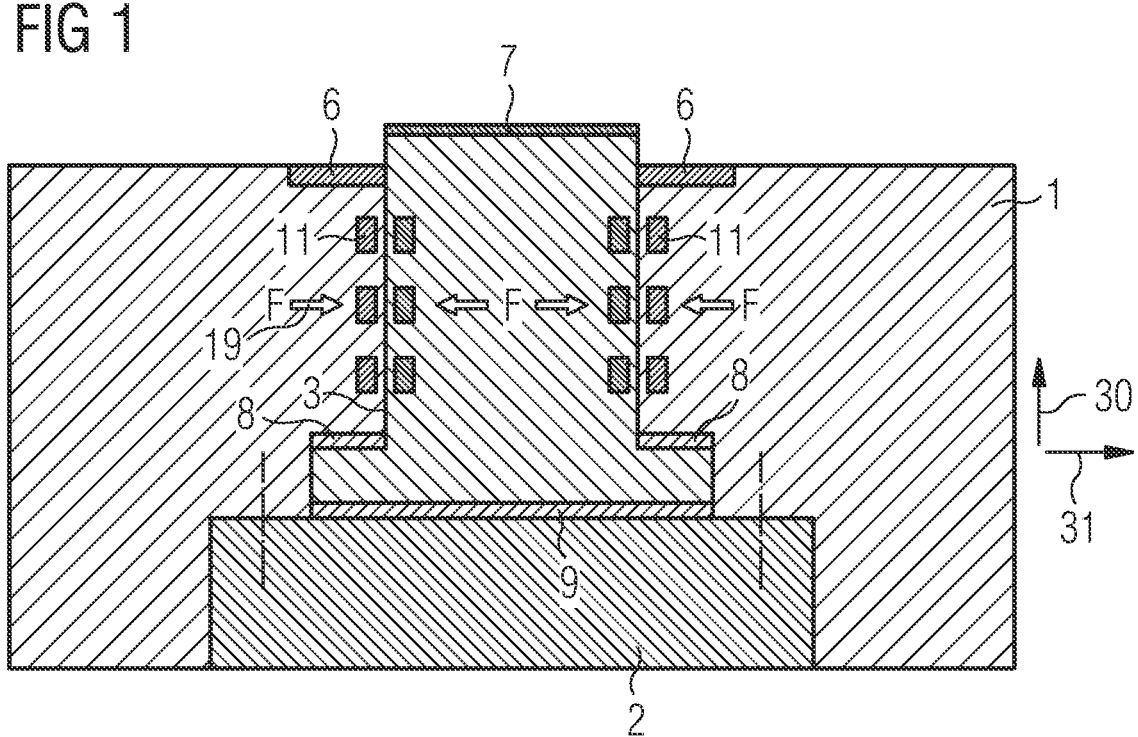
FIG. 1 shows one half of a molding tool according to one embodiment.

In the embodiment in FIG. 1, controllable adjustment elements 11 are provided in contrast to the conventional approach in FIG. 6. Here, the controllable adjustment elements 11 are provided on an inner side of a socket (recess) of the base tool 1, as illustrated in FIG. 1, wherein the molding core 3 is accommodated in the socket, and/or are provided on an outer side of the molding core 3. The controllable adjustment elements 11 can be arranged around the molding core 3 and/or can be arranged at various levels (at three levels in the example in FIG. 1). In this case, the controllable adjustment elements 11 can be wedged over the entire circumference of the molding core 3, or, alternatively, over only part of the circumference. The controllable adjustment elements 11 make it possible to produce a force F, as indicated by arrows 19, by means of which the molding core 3 can be fixed in the base tool 1 with reproducible accuracy of position. Here, the accuracy of position can be less than 10 μm, preferably less than 5 μm.

In this context, a controllable adjustment element is generally an element, the position, extent and/or exerted force of which can be controlled, e.g. via corresponding control lines. Here, the term "can be controlled" includes the possibility of closed-loop control or some other type of adjustment. Controllable adjustment elements of this kind can be mechanical, pneumatic and/or hydraulic elements. In the case of mechanical elements, it is possible, for example, for wedges to be moved relative to one another or for spring elements to be actuated in order in this way to modify an extent of elements, or elements can be moved in respect of their position by means of corresponding drives. In the case of pneumatic or hydraulic elements, a chamber can be filled with gas (pneumatic) or liquid (hydraulic) in order to modify the extent thereof. As a particular preference, hydraulic expansion elements, which can be designed as single- and/or multi-way chamber systems, can be used as controllable adjustment elements. In the case of hydraulic expansion elements an expanding sleeve is deformed by the action of hydraulic oil, this being possible with high reproducibility. By means of the controllable adjustment elements 11, it is thus possible to achieve reproducible positioning of the molding core in a direction (in a horizontal direction) as indicated by the arrows 19 in FIG. 1. Since the controllable adjustment elements can be controlled via corresponding control lines, an adjustment is furthermore possible without having to disassemble the molding tool.

Figure 2:
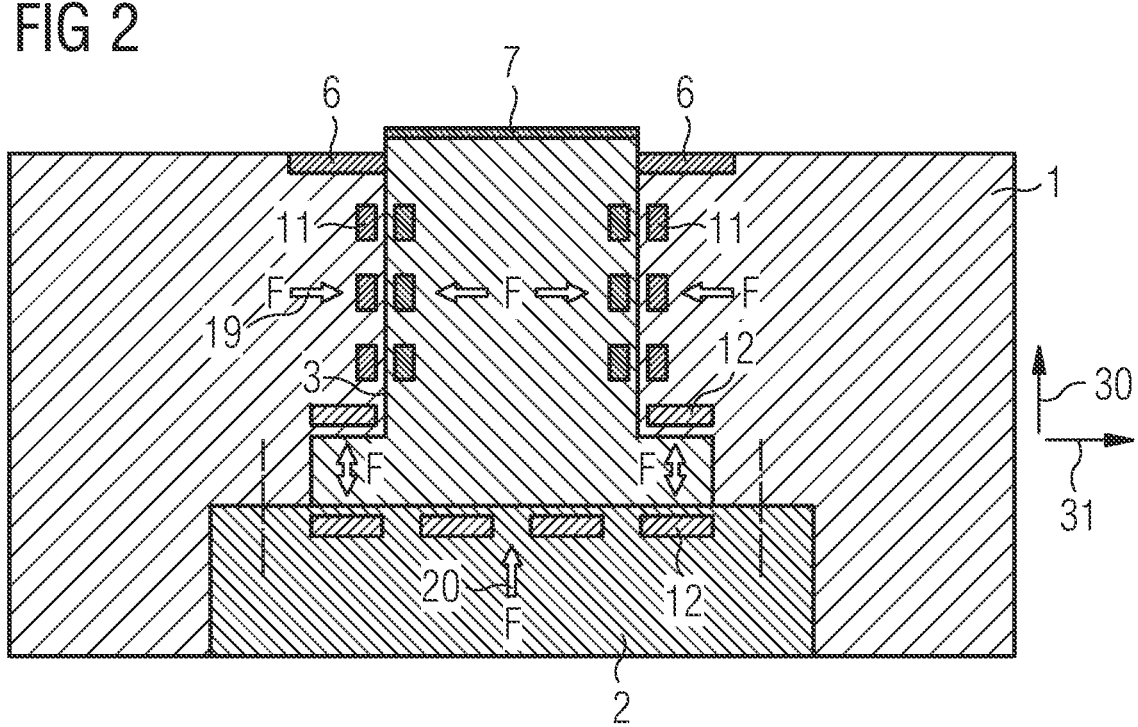
FIG. 2 shows one half of a molding tool according to another embodiment.

Another embodiment of the molding tool is illustrated in FIG. 2. In comparison with the embodiment in FIG. 1, the distance plates 8, 9 used for vertical adjustment (adjustment in the vertical direction) of the molding core 3 have been replaced by controllable adjustment elements 12. As indicated by arrows 20, a force in the vertical direction can be exerted on the molding core 3 by these controllable adjustment elements 12, thus allowing vertical adjustment. In respect of the configuration of the controllable adjustment elements 12, the statements made in relation to the controllable adjustment elements 11 apply.

The controllable adjustment elements 12 can be arranged at various points around a molding core 3 (all the way round or part way round), and/or at various points on a lower side of the molding core 3. As illustrated, some of the adjustment elements 12 are arranged on the bottom of the socket and others are arranged on an upper side of a recess of the socket (for accommodating a widened part of the molding core 3). By means of the controllable adjustment elements 12, a vertical adjustment can be performed, in particular by open-loop or closed-loop control, without the need to exchange plates, such as the distance plates 8, 9. Thus, for the vertical adjustments, there is no need particularly for disassembly of the molding tool, and adjustment can take place in the installed state, e.g. on the basis of measurement of a workpiece produced, without new inaccuracies arising due to disassembly.

In the case of the embodiments in FIGS. 1 and 2, the molding tool must be disassembled as before, in particular the support plate 2 must be removed, in order to exchange the molding core. In the embodiment in FIG. 3, this is no longer necessary. In particular, the base tool 11 in the embodiment in FIG. 3 has a socket for the molding core 3 which is free from undercuts. Moreover, the base tool 1 has controllable adjustment elements 13, which are movable, as indicated by arrows 21, to enable them to be moved backward and forward between a first position, in which they are in engagement with recesses 14 in the molding core 3, and a second position, in which they release the molding core 3, enabling it to be removed. Here, the controllable adjustment elements 13 can be driven pneumatically, hydraulically or mechanically. It should be noted that the controllable adjustment elements 13 and the recesses 14 are dimensioned in a manner sufficient to tolerate relatively high forces (up to several tens of kilonewtons) occurring during molding. In the cross-sectional view in FIG. 3, two controllable adjustment elements 13 are shown in this case. It is also possible for a plurality of such elements to be arranged around the molding core 3, and/or the controllable adjustment elements 13 can be arranged at various positions in the vertical direction.

Figure 3:
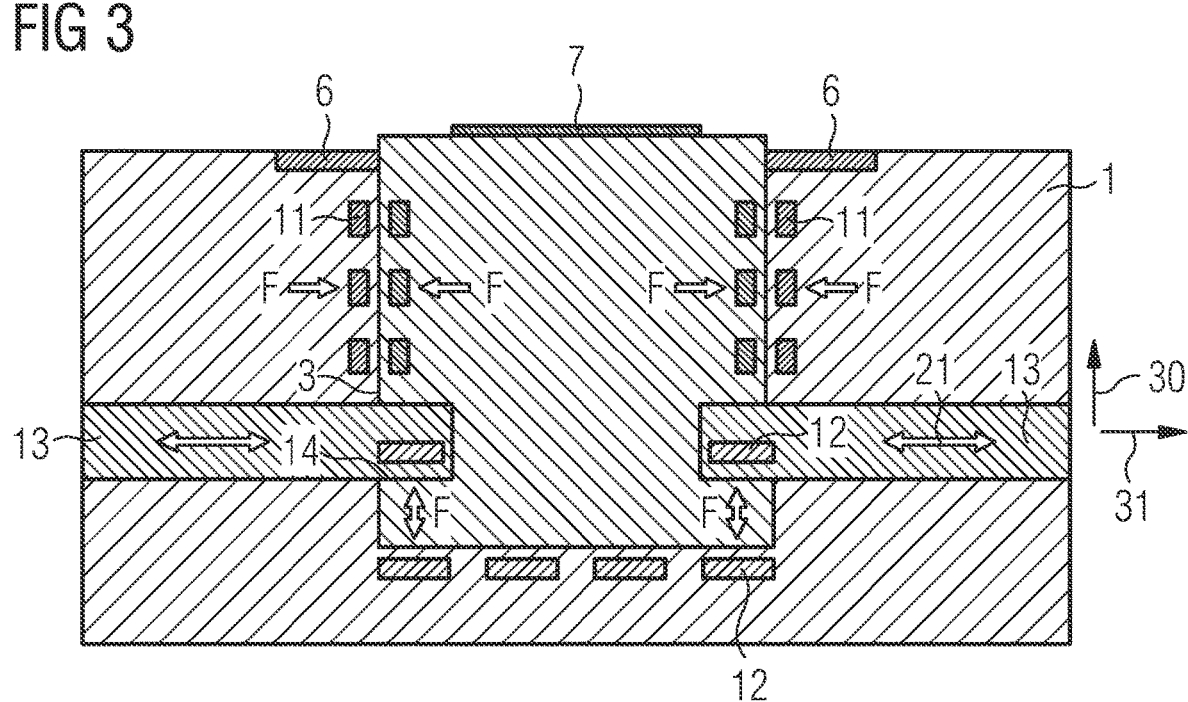
FIG. 3 shows one half of a molding tool according to another embodiment.

As illustrated in FIG. 3, some of the controllable adjustment elements 12 can be arranged in the controllable adjustment elements 13 in this case.

Figure 4:
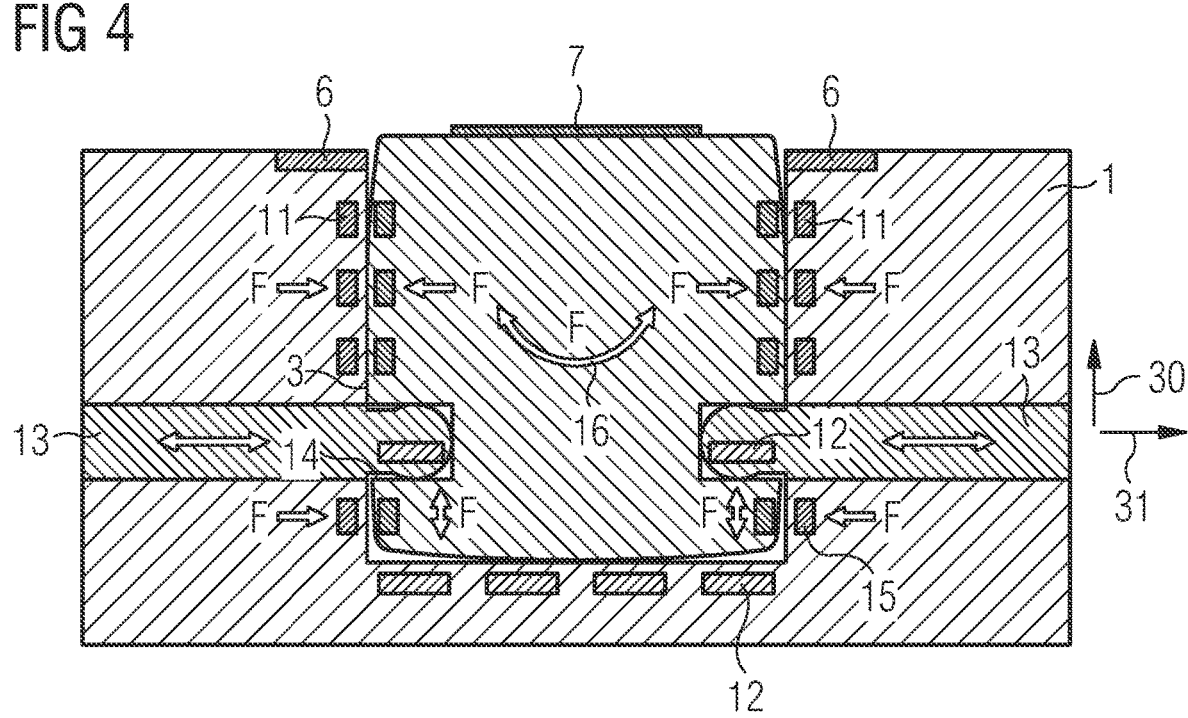
FIG. 4 shows one half of a molding tool according to another embodiment.

FIG. 4 shows a further modification, which can be used in molding tools according to the invention. In the embodiment in FIG. 4, the molding core 3 has a slightly convex, rounded shape as compared with the angular shape in FIGS. 1-3. In this case, individual control of the controllable adjustment elements 11 and 12 and, if appropriate, of further controllable adjustment elements 15 can be used to adjust a tilt of the molding core, as indicated by an arrow 16 in FIG. 4. To make this possible, ends of the controllable adjustment elements 13 which are in engagement in the recesses 14 can likewise have a rounded shape. In this way, angular tolerances of less than 20", preferably less than 10", can be achieved.

The embodiments explained with reference to FIGS. 1-4 have improved adjustment capabilities for molding cores relative to the base tool into which they are inserted. As already explained, the various modifications can be employed independently of one another. Thus, embodiments can have any desired combinations of the adjustment elements 11, 12, 13 and 15 (the latter together with the rounded molding core), wherein it is also possible to omit one or more of these adjustment elements. An embodiment in which an adjustment of two molding tool halves relative to one another is improved and it is thus also possible for the molding cores of the two halves to be adjusted with increased accuracy relative to one another will now be discussed with reference to FIG. 5.

In the embodiment in FIG. 5, with the molding tool of FIG. 5, the controllable adjustment elements which were discussed with reference to FIGS. 1-4 are here provided both in half A and in half B. In other embodiments, it is also possible for just some of these adjustment elements or none of these adjustment elements to be used.

As explained at the outset with reference to FIG. 6, one of the base tool halves (in this case half B) has guide columns 4B, which enter into engagement with corresponding guide holes 4A in half A. Moreover, precision guides 5A, which engage in corresponding recesses 5B in half B, are provided. Conversely, it is equally possible for the guides to be provided on half B and the recesses on half A.

Here, in contrast to the conventional molding tool in FIG. 6, the guides 5A have controllable adjustment elements 17, and/or the recesses 5B have controllable adjustment elements 17B. The controllable adjustment elements 17A, 17B can once again be configured in the manner already explained above in relation to other controllable adjustment elements. The controllable adjustment elements 17A and/or 17B enable the base tool halves 1A, 1B and thus the molding cores 3A, 3B to be positioned with improved accuracy relative to one another since the base tool halves can be moved slightly in the horizontal direction relative to one another by means of forces that can be produced by the controllable adjustment elements 17A and/or 17B, as indicated by arrows 18, thus allowing accurate positioning.

By means of the described set of controllable adjustment elements, it is thus possible to increase the accuracy of manufacture of plastic elements by molding, and this can be used, in particular, to produce optical elements, e.g. for smart glasses.

The invention claimed is:

1. A molding tool, comprising:
a base tool;
a socket defined by the base tool;
a molding core received in the socket; wherein the molding core has opposed side walls each defining a discrete recess therein, wherein the recesses are spaced a lateral distance apart from one another;
at least two controllable adjustment elements for determining a position of the molding core within the socket of the base tool;
wherein the at least two controllable adjustment elements are arranged in the base tool and are movable between a first position and a second position, wherein the at least two controllable adjustment elements each project into the socket in the first position and enter into the corresponding discrete recess in the molding core thereby engaging the molding core with the base tool, and the at least two controllable adjustment elements are retracted in the second position and withdrawn from the corresponding discrete recesses, thereby releasing the molding core from the base tool.

2. The molding tool as claimed in claim 1, wherein the molding core has an upper surface, a lower surface and lateral surfaces, wherein a molding surface is formed on the upper surface, and wherein the at least two controllable adjustment elements are arranged on the lateral surfaces of the molding core.

3. The molding tool as claimed in claim 1, wherein the at least two controllable adjustment elements are arranged in a lateral surface of the base tool which circumscribes the socket, for horizontal position adjustment of the molding core.

4. The molding tool as claimed in claim 1, wherein the socket is bounded and defined by a bottom surface and an interior lateral surface of the base tool, and wherein a first adjustment element of the at least two controllable adjustment elements is arranged on the bottom surface of the base tool and a second adjustment element of the at least two controllable adjustment elements is arranged in the interior lateral surface of the base tool for vertical position adjustment of the molding core.

5. The molding tool as claimed in claim 1, wherein the at least two controllable adjustment elements comprise at least one adjustment element arranged in the base tool and at least one adjustment element arranged in the molding core that allow for adjustment of a vertical position of the molding core.

6. The molding tool as claimed in claim 1, wherein the at least two controllable adjustment elements are arranged in the base tool to set a tilt of the molding tool relative to the base tool.

7. The molding tool as claimed in claim 6, wherein the molding core has a rounded shape, thus enabling the molding core to be tilted in the socket by actuating the at least two controllable adjustment elements arranged in the base tool.

8. The molding tool as claimed in claim 1, wherein the base tool, the socket defined by the base tool, the molding core received in the socket and the at least two controllable adjustment elements for determining the position of the molding core within the socket comprise a first part of the molding tool; and wherein the molding tool further comprises a second part of the molding tool and the second part includes:
a further base tool;
a further socket defined by the further base tool;
a further molding core received in the further socket; and
at least two further controllable adjustment elements for determining the position of the further molding core within the further socket; and
wherein the base tool and the further base tool are assembled for molding; and
wherein the molding tool further includes an additional adjustment element for adjusting a position of the base tool relative to the further base tool in an assembled state.

9. The molding tool as claimed in claim 8, wherein the additional adjustment element for adjustment is arranged in one or more of a guide column and in a guide recess.

10. The molding tool as claimed in claim 1, wherein the at least one controllable adjustment element comprises one or more of a mechanical, pneumatic and a hydraulic adjustment element.

11. The molding tool as claimed in claim 1, further comprising a controllable hydraulic expansion clamping element.

12. The molding tool as claimed in claim 11, wherein the controllable hydraulic expansion clamping element comprises an expanding sleeve that deforms by an action of hydraulic oil.

13. A molding tool, comprising:
a base tool;
a socket defined by the base tool;
a molding core received in the socket; wherein the molding core has a top wall, an opposed bottom wall, a first side wall and an opposed second side wall extending between the top wall and the bottom wall;
a discrete recess defined in each of the first side wall and the second side wall of the molding core; said discrete recesses being defined between the top wall and the bottom wall of the molding core;
at least two controllable adjustment elements arranged in the base tool and configured for determining a position of the molding core within the socket of the base tool; wherein the at least two controllable adjustment elements are movable between a first position and a second position;
wherein each of the at least two controllable adjustment elements project into the socket in the first position and enter into the discrete recesses defined in the first side wall and second side wall of the molding core thereby engaging the molding core with the base tool;
wherein each of the at least two controllable adjustment elements are retracted in the second position and are withdrawn from the discrete recesses in the first side wall and the second side wall of the molding core, thereby releasing the molding core from the base tool; and
wherein the bottom wall of the molding core is rounded and contacts a bottom wall of the socket, wherein the rounded bottom wall enables tilting of the molding core within the socket.

14. A molding tool, comprising:
a base tool;
a socket defined by the base tool;
a molding core received in the socket; wherein the molding core has a bottom wall and opposed side walls extending upwardly from the bottom wall; wherein each side wall defines a discrete recess therein; and
at least two controllable adjustment elements arranged in the base tool, and configured for determining a position of the molding core within the socket of the base tool;
wherein the at least two controllable adjustment elements are movable between a first position and a second position; and each of the at least two controllable adjustment elements projects into the socket in the first position and enters into one of the discrete recesses defined in the side walls of the molding core, thereby engaging the molding core with the base tool;
wherein the at least two controllable adjustment elements are retracted in the second position and are withdrawn from the discrete recesses, thereby releasing the molding core from the base tool;
wherein each of the at least two controllable adjustment elements has a rounded terminal end; and
wherein each of the discrete recesses is bounded and defined by flat surfaces of the molding core, and wherein contact between the rounded terminal ends of the at least two controllable adjustment elements and the flat surfaces of the molding core enables tilting of the molding core within the socket and relative to the base tool.

15. A molding tool, comprising:
a base tool;
a socket defined by the base tool;
a molding core received in the socket; wherein the molding core defines at least one recess therein;
at least one controllable adjustment element selectively receivable in the at least one recess; and
a further controllable adjustment element provided on the at least one controllable adjustment element.

16. The molding tool as defined in claim 15, wherein the further controllable adjustment element is provided on a terminal end of the at least one controllable adjustment element that is received in the at least one recess.

17. A method of producing an optical element comprising:
providing a first mold half and a second mold half of a molding tool, wherein each of the first mold half and second mold half includes a base tool; a socket defined by the base tool; and a molding core receivable in the socket, and wherein the molding core includes a molding surface;
operatively engaging the first mold half and the second mold half of the molding tool with one another so as to define a mold cavity between the opposed molding surfaces of the first mold half and second mold half;
engaging the molding core of the first mold half with the base tool of the first mold half by providing at least two controllable adjustment elements in opposed side walls of the base tool of the first mold half, moving the at least two controllable adjustment elements into a first position where the at least two controllable adjustment elements project into the socket of the first mold half and subsequently into corresponding discrete recesses defined in opposed first and second side walls of the molding core of the first mold half, wherein the first and second side walls extend between a top wall and a bottom wall of the molding core;
heating plastic pellets to produce liquefied plastic;
injection feeding the liquefied plastic by means of a feed system into the mold cavity defined between the first mold half and the second mold half;
allowing the liquefied plastic to cool and form a molded optical element;
moving the at least two controllable adjustment elements to a second position where the at least two controllable elements retract from the corresponding discrete recesses defined in the first and second side walls of the molding core of the first mold half and thereby disengaging the molding core of the first mold half from the base tool of the first mold half; and
ejecting the molded optical element from between the first mold half and the second mold half.

18. The method as defined in claim 17, further comprising:
adjusting a tolerance of the molding core of the first mold half relative to the base tool of the first mold half by providing a rounded bottom wall on the molding core of the first mold half that engages a flat surface on the base tool of the first mold half and thereby enables the molding core of the first mold half to be tilted relative to the base of the first mold half.

19. The method as defined in claim 17, further comprising:

adjusting a tolerance of the molding core of the first mold half relative to the base tool of the first mold half by providing a rounded terminal end on at least one of the at least one controllable adjustment element of the base tool, wherein the rounded terminal end enables tilting of the molding core of the first mold half relative to the base of the first mold half.

20. The method as defined in claim 17, further comprising:

adjusting a tolerance of the molding core of the first mold half relative to the base tool of the first mold half by providing and additional controllable adjustment element on the at least one controllable adjustment element, and moving the additional controllable adjustment element to further adjust a position of the molding core of the first mold half relative to the base of the first mold half.

\* \* \* \* \*